Jan. 2, 1962    J. E. MacADAMS    3,015,271
DEPTH CONTROL DEVICE FOR A SUBFLOATING BODY
Filed Nov. 30, 1942    5 Sheets-Sheet 2

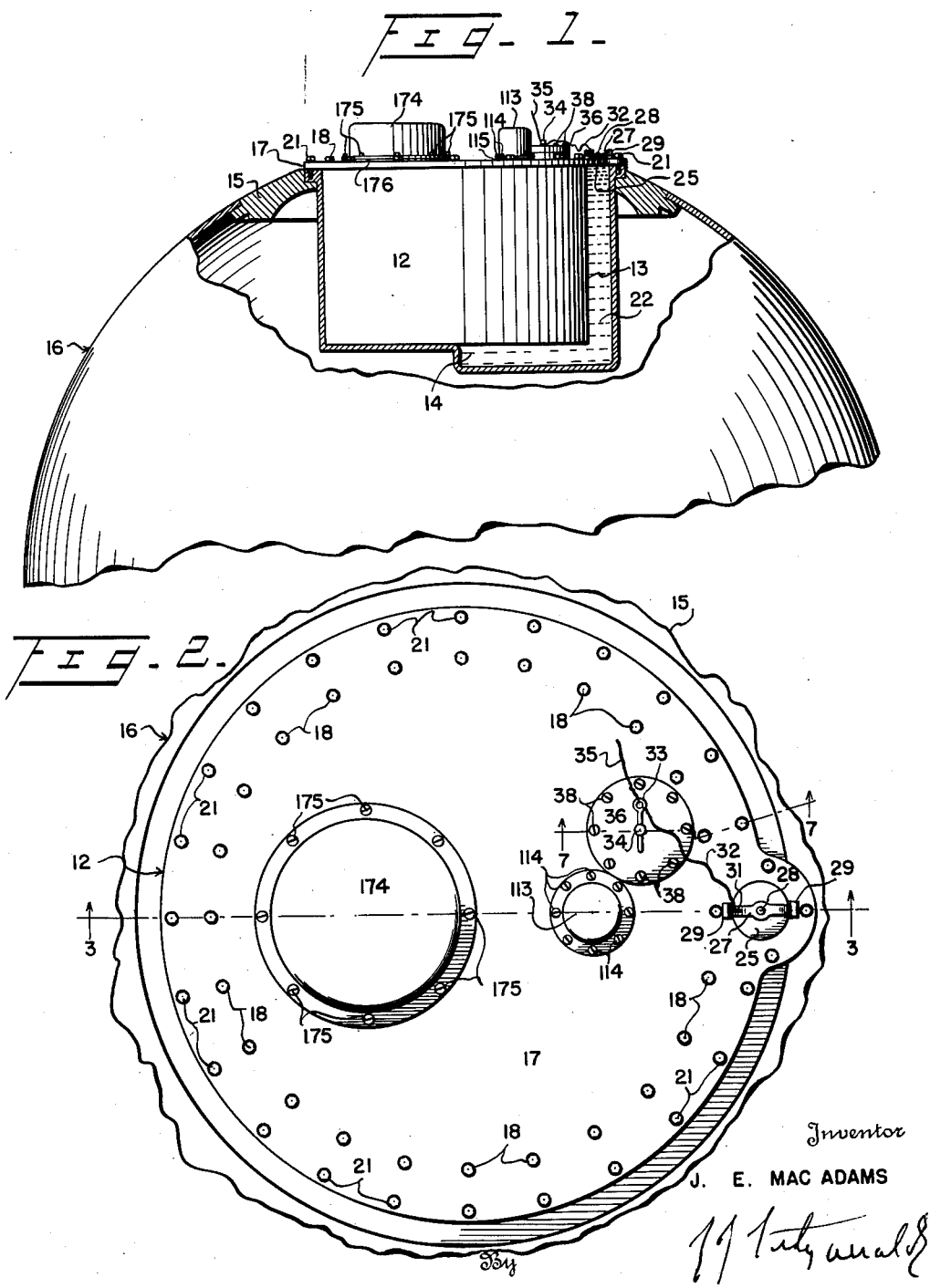

Inventor
J. E. MAC ADAMS

By
Attorney

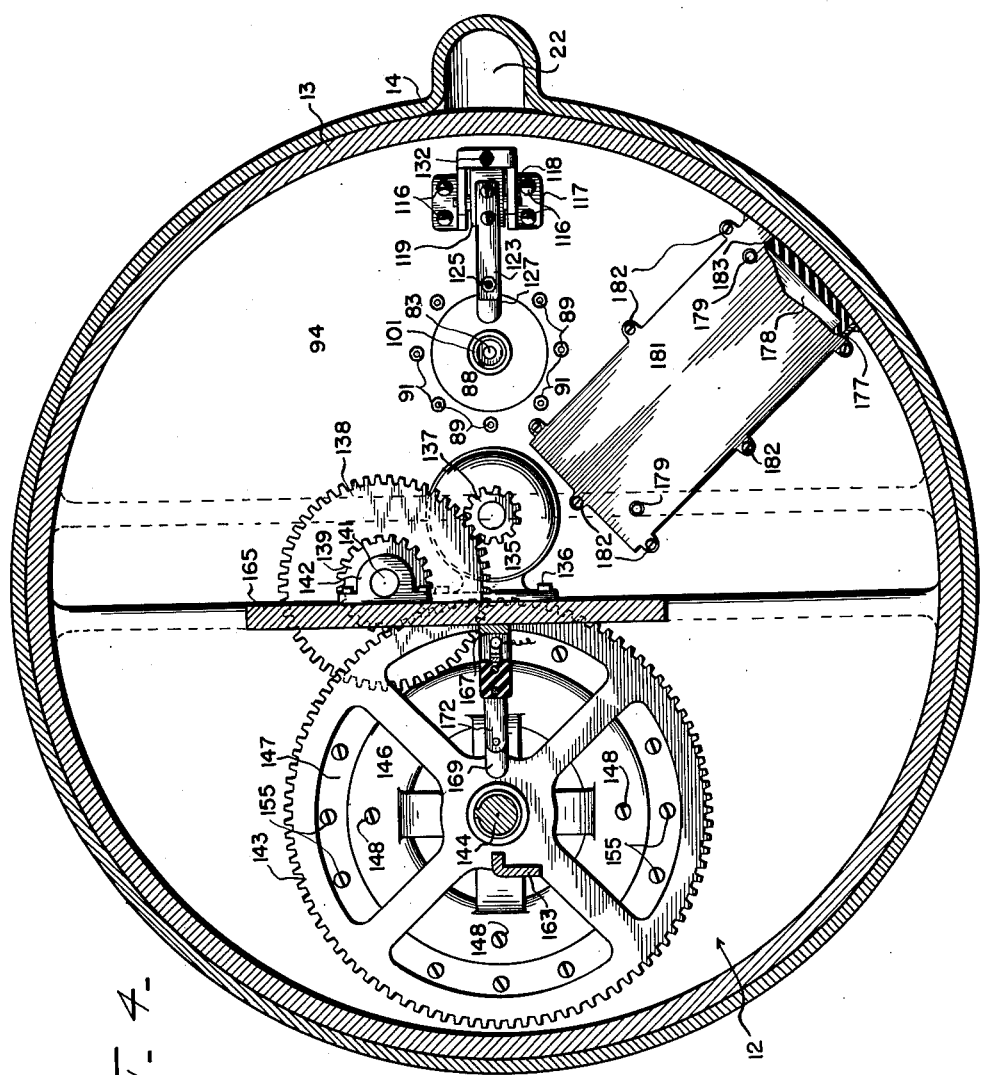

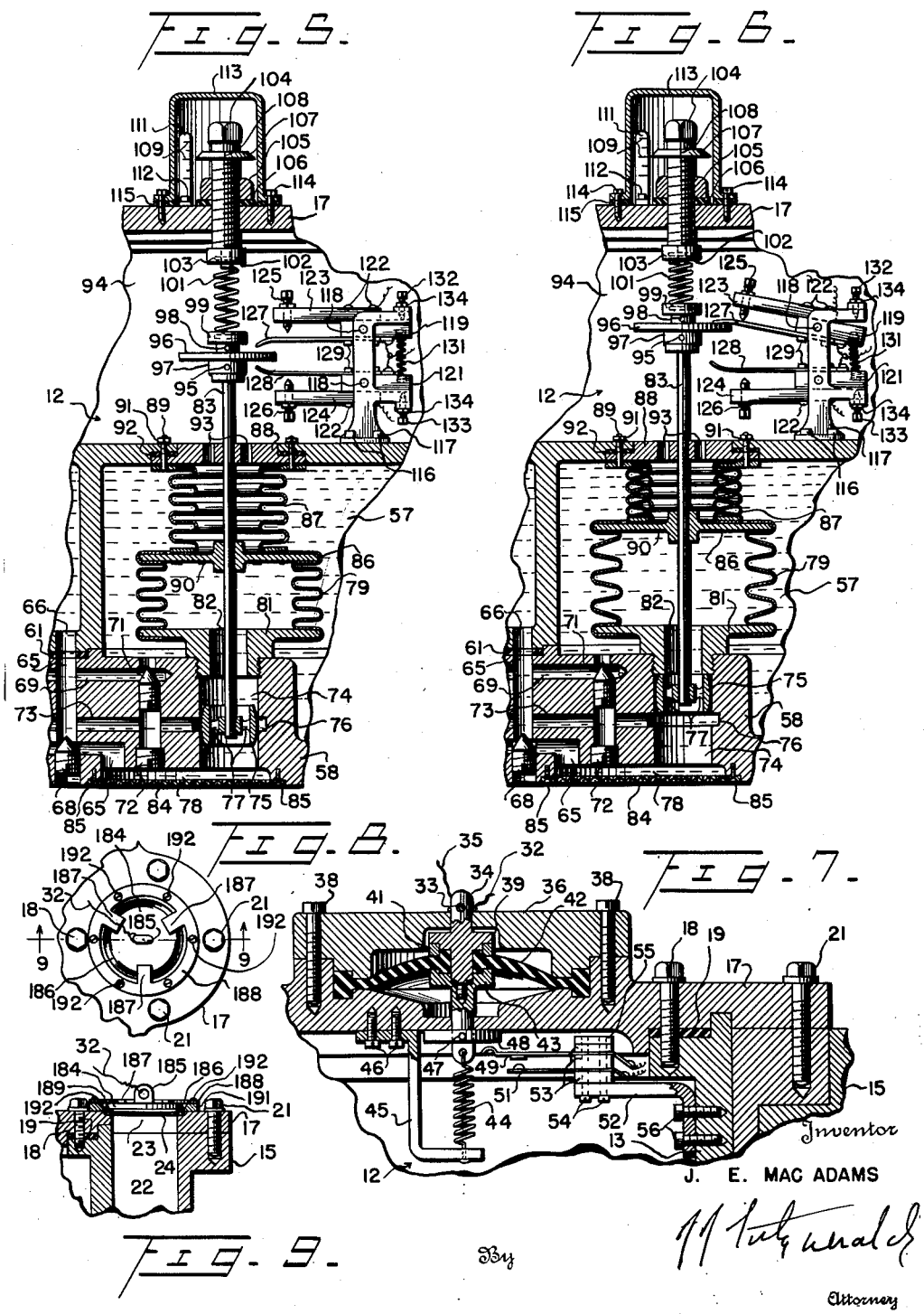

Jan. 2, 1962   J. E. MacADAMS   3,015,271
DEPTH CONTROL DEVICE FOR A SUBFLOATING BODY
Filed Nov. 30, 1942   5 Sheets-Sheet 5

Inventor
J. E. MAC ADAMS

By
Attorney

United States Patent Office 3,015,271
Patented Jan. 2, 1962

3,015,271
DEPTH CONTROL DEVICE FOR A
SUBFLOATING BODY
Jesse Edward MacAdams, 308 Patterson Court,
Takoma Park, Md.
Filed Nov. 30, 1942, Ser. No. 467,478
15 Claims. (Cl. 102—14)
(Granted under Title 35, U.S. Code (1952), sec. 266)

This invention relates to improvements in automatic depth control devices for freely subfloating bodies. More specifically, the invention relates to a depth controlling or regulating device adapted to be attached to or incorporated within a subfloating body such as a submarine mine or the like in which the device, after having been launched within a body of water, is caused to float at a predetermined depth of submersion by adjusting the specific gravity of the device to the specific gravity of the surrounding water by a series of successive adjusting operations performed in time space relation during each movement of the device beyond predetermined upper and lower control limits, the adjusting operations being controlled by the pressure differential of the water within a control chamber in communication with a flotation chamber and the pressure of the surrounding water.

In devices of this character heretofore proposed it has been the general practice to control changes in the specific gravity of the device by differences in the pressure of the surrounding water and the pressure of the air enclosed within the device whereby an oscillating movement of the device within the water is brought about by changes in the specific gravity of the floating body corresponding respectively to each of the oscillations of the device. Certain other devices hitherto devised for effecting an oscillating movement of a subfloating body are adjusted to a specific gravity either greater or less than that of the surrounding water, as the case may be, and are provided with a screw propeller controlled by a hydrostat for reversing the movement of the subfloating body caused by the unbalanced condition of the specific gravity of the body. Such devices consume a considerable amount of power for maintaining the oscillatory movement and the sources of power proposed for this purpose, in general, require a rather complicated controlling mechanism and bring about various difficulties thereby reducing the reliability of operation of the bodies in service.

Furthermore, such devices, in general, possess the disadvantage of increasing the vertical travel of a body with each succeeding oscillation and, in cases where the controlling mechanism is adapted to effect sufficiently large changes in the specific gravity of the body, the amplitude of the oscillations may increase sufficiently to cause the mine to rise to the surface of the water or sink within the water to a depth sufficient to crush the mine by the pressure of the surrounding water.

The device of the present invention is adapted to perform all of the functions of the prior devices in a satisfactory manner and possesses none of the foregoing disadvantages of the prior devices. The device is adapted for use with a mine of relatively small diameter as well as with the largest type of mines now in general use and, if desired, the device of the present invention may be employed to control the depth of submergence of a large submerged body such, for example, as a submarine by reason of the novel arrangement of instrumentalities and the use of the principle and method of control of the depth regulating mechanism employed with the device of the present invention.

In the preferred embodiment of the invention the device is provided with a Sylphon or displacement bellows operatively connected to an electric motor adapted to expel water from a casing or chamber, herein referred to as a flotation chamber, or to admit water thereto by way of a duct or outlet in accordance with the direction of rotation of the motor and, concurrently therewith, vary the pressure of the water within a control chamber, means being provided to stop the motor in the event that the bellows is expanded or contracted, as the case may be, a predetermined maximum distance in either direction from an intermediate setting. The power for the operation of the motor is obtained from a battery arranged within the device to which the motor is selectively connected by way of a reversing switch mechanism, the mechanism comprising two pairs of normally open switch control contacts respectively connected to two windings of the motor whereby the motor is adapted to operate selectively in either direction in accordance with the operated condition of the control contacts. The contact actuating means preferably comprises a circular bellows in communication interiorly with an air chamber and operatively connected to another circular bellows of greater diameter having the interior portion thereof in communication with the sea water. The exterior portion of the two last named bellows is in communication with the water within the control chamber and connected to the aforesaid flotation chamber by a duct whereby variations in pressure within the flotation chamber caused by the movement of the main bellows are transferred to the control chamber. A valve is preferably employed to control the rate of flow of water within the aforesaid duct.

An arrangement is thus provided in which the control contacts are actuated to closed position selectively in accordance with the differential pressure between the water within the larger control bellows, the water within the control chamber exterior to the control bellows and the combined pressure of the air and spring within the smaller one of the control bellows, this selective closure of the control contacts and the selective operation of the motor thereby, comprising an arrangement adapted to anticipate a control signal to be subsequently received from a variation in the pressure of the surrounding water. When a predetermined relation or state of balance exists between the larger and the smaller control bellows, both pairs of control contacts are open, this condition of balance taking place at a predetermined depth of submersion of the device within a body of water controlled by a depth adjusting screw and resilient spring operatively connected to the control bellows and at certain other portions of the oscillatory travel of the device within the water beyond predetermined control limits of submersion by reason of the anticipation feature of the device, as will be more clearly apparent as the description proceeds.

There is also provided a duct or vent between the flotation chamber and the surrounding water having a relatively small orifice therein through which the water is allowed to pass, the rate of flow of the water within this orifice being preferably controlled as by an adjusting screw or valve. There is also provided a by-pass or duct in communication with the flotation chamber whereby an additional passage for the flow of water between the flotation chamber and the surrounding water may be effected variably in accordance with the instant position of a valve controlled by the differential control bellows. An arrangement is thus provided in which communication between the flotation chamber, the control chamber and the surrounding water is established through the orifice in the duct extending therebetween when the Sylphon control element is in a state of balance and in which an additional passage between the flotation chamber, the control chamber and the surrounding water is rendered effective by the valve variably in accordance with the degree of movement of the Sylphon control element from the balanced position thereof.

The motor circuit is normally rendered ineffective by a switch element controlled by an arming wire and the removal of the arming wire, as the mine is launched, causes the switch element to close in part the motor operating circuit.

By interrupting the operation of the buoyancy controlling mechanism occasionally during the excursions of the subfloating body beyond the control tolerance of submersion in the maner herein disclosed, the interruptions being more frequent and of greater duration as the body approaches the desired depth of submersion beyond the control tolerance, an arrangement is provided in which the amplitude and frequency of the oscillations of the body and the drain on the source of power is reduced to a minimum and the period of time during which the controlling mechanism is effective to maintain the subfloating body at the predetermined depth of submersion is prolonged by reason of the reduced drain on the source of power required to maintain the depth control mechanism effective.

One of the objects of the present invention is the provision of new and improved means for controlling the depth of submersion of a subfloating body by variations in the specific gravity of the body controlled by the differential pressure within a control chamber and the surrounding water caused by variations in the pressure of the water within a flotation chamber as the specific gravity of the body is changed.

Another of the objects is the provision of new and improved means for controlling the submergence of a subfloating body such that the body is adapted to oscillate in close proximity to a predetermined depth of submersion of the body within the water and in which the specific gravity of the body is varied by a plurality of changes in time spaced relation during each excursion of the body beyond a predetermined control limit sufficient to compensate for differences between the specific gravity of the body and the surrounding water.

Another of the objects is to provide a new and improved buoyancy control device adapted to maintain a subfloating body at a predetermined depth of submersion within the water in which the corrective changes in the buoyancy of the device are performed by increments during each movement of the body beyond predetermined control limits of submersion and are proportional to the extent of movement of the body from the predetermined depth of submersion.

Another of the objects is to provide means for correcting the specific gravity of a subfloating body when the body has passed beyond certain predetermined control limits of submersion within a body of water in which the corrections in the specific gravity of the body are made at intervals of time during each excursion of the body beyond the control limits of submersion.

Another of the objects is to provide a new and improved buoyancy control device for a subfloating body adapted to initiate corrective changes in the specific gravity thereof and arrest the corrective changes prior to and in anticipation of the body reaching the predetermined depth of submersion, such that the oscillations of the body about the predetermined depth of submersion are greatly reduced or stopped at the predetermined depth of submersion.

Another of the objects is to provide means for controlling changes in the volume of a subfloating body by anticipating a predetermined depth of submersion of the body during each oscillatory movement thereof through the water concurrently with the travel of the body beyond predetermined control limits of submersion.

Still another object is the provision of means for varying the degree of anticipation of the subfloating device whereby changes of predetermined character in the volume of the device are performed in succession by the buoyancy control mechanism during each oscillatory movement of the device beyond predetermined limits of control.

A further object is the provision of new and improved means for interrupting the operation of the volume displacement actuating mechanism when the volume displacement device has moved a predetermined distance in either direction from an intermediate position.

A still further object is the provision of a new and improved buoyancy control device for a subfloating body which is economical to manufacture, reliable in operation and which possesses all of the qualities of ruggedness and durability in service.

Still other objects, advantages and improvements will be apparent from the following description taken in connection with the accompanying drawings of which:

FIG. 1 is a view in elevation partly in section and partly broken away of a preferred form of the device employed for controlling the depth of submersion of a submarine mine;

FIG. 2 is an enlarged plan view of the device of FIG. 1 with the mine partly broken away;

FIG. 4 is a view in section taken along the line 4—4 of FIG. 3;

FIG. 5 is a view partly in section and partly broken away of the differential pressure responsive motor control mechanism in the balanced position thereof;

FIG. 6 is a view partly in section and partly broken away showing the differential pressure responsive motor control mechanism in a position to cause the buoyancy of the device to be increased;

FIG. 7 is a greatly enlarged view in section, partly broken away, of the starting switch mechanism taken substantially along the line 7—7 of FIG. 2;

FIG. 8 is a plan view of an alternate form of a fluid sealing cap suitable for use with the present invention adapted to be removed by an arming wire as the device is launched within the water;

FIG. 9 is a fragmentary view in section taken along the line 9—9 of FIG. 8;

Figure 3:
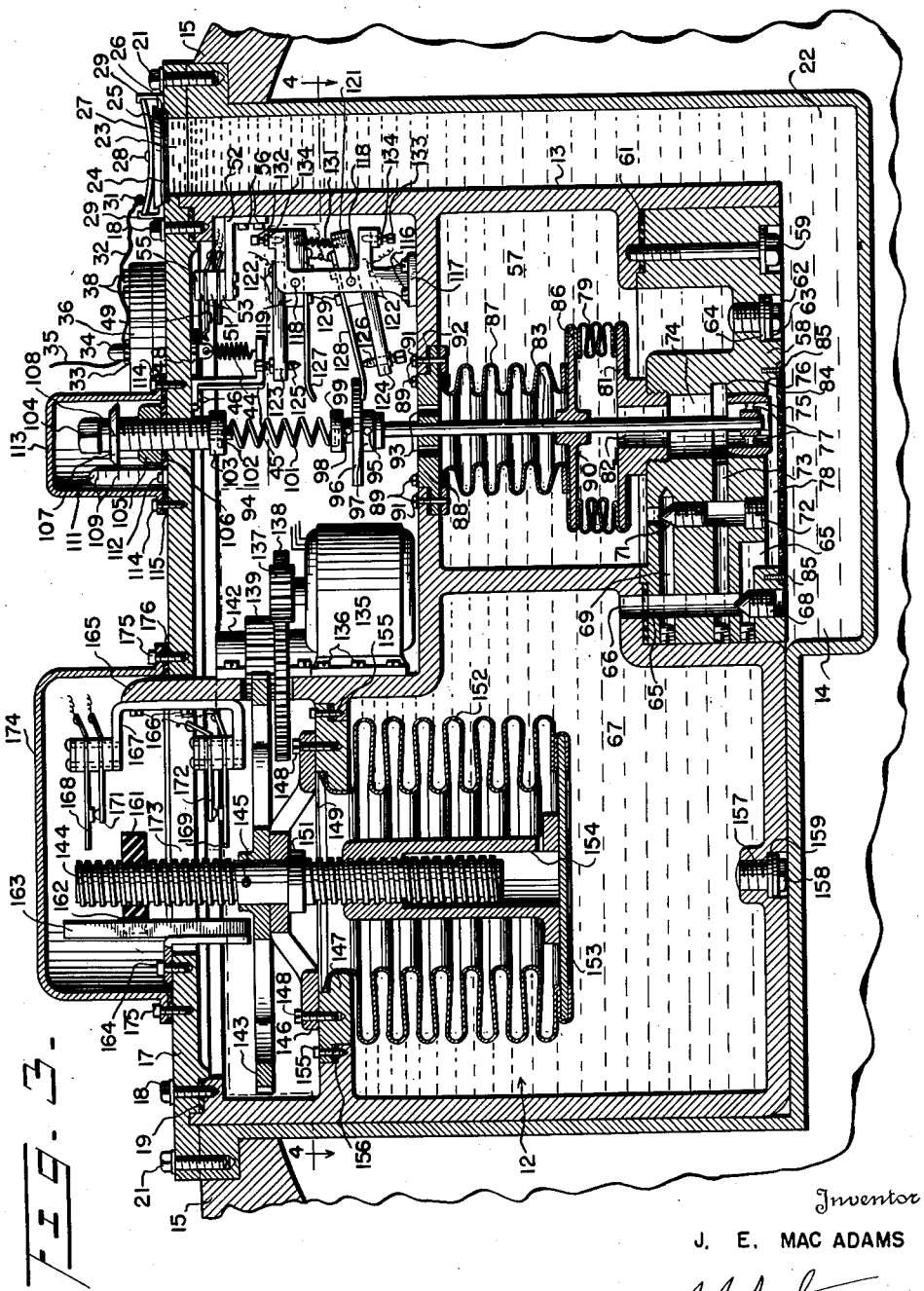
FIG. 3 is an enlarged view of the device in section taken along the line 3—3 of FIG. 2.

Referring now to the drawings on which like numerals of reference are employed to designate like parts throughout the several views and more particularly to FIGS. 1 and 2 thereof there is shown thereon a depth control device indicated generally by the numeral 12 comprising a casing 13 arranged within a well 14 formed within the casing 15 of a submarine mine indicated generally by the numeral 16. The casing 13 of the depth control device is provided with a top plate or cover 17 secured to the casing as by the bolts 18, a suitable gasket 19, FIG. 3, being arranged between the cover and the casing to insure an airtight joint therebetween. The cover is adapted to receive a plurality of bolts 21 whereby the depth control device is secured to the mine casing 15.

The well 14 is provided with a recessed portion 22 extending transversely beneath the depth regulating device and upwardly into abutting relation with an aperture 23 arranged within the cover or plate 17 of sufficient size to admit the flow of water to the interior of the depth control device. A screen or perforated plate 24 is preferably arranged across the aperture 23 to prevent the entrance of foreign objects, or any of the various forms of sea life of sufficient size to prevent or impede the operation of the device, from entering the recessed portion 22 of the well, the screen being secured to the plate 17 in any suitable manner. The aperture 23 within the plate is sealed by a detachable cover 25 and a gasket 26 detachably maintained in the assembled position as by the resilient bar or clip 27 pivotally secured to the cover as at 28, the ends of the bar being normally forced beneath a pair of retaining elements 29 secured in any suitable manner to the plate 17 on opposite sides of the cover 25. The bar 27 is provided preferably with an eye bolt 31 secured at one end portion thereof to which is attached one end of a length of wire or chain 32 having the other end secured to an arming pin 33 adapted to be withdrawn from a plunger 34 by an arming wire 35 whereby the arming wire causes the arming pin to be removed from the plunger and the cover 25 to be detached from the plate 17 as the device is launched within a body of water.

The plunger 34 is slideably arranged within a cap 36 secured to the plate 37 as by the screws 38. The plunger is provided with a shoulder 39 adapted to receive a gasket 41 and securely engage and clamp a resilient diaphragm 42 to the member 43 slideably supported within the plate 17, the outer portion of the diaphragm being adapted to be sealed to the plate 17 as by the cap 36. The member 43 has secured thereto a resilient spring 44 attached to a bracket 45 secured to the lower portion of the plate 17 as by the screws 46 whereby the member 43 is withdrawn inwardly by the spring 44 when the arming wire is removed from the plunger 34. There is also secured to the member 43 as by the pin 47 a disk or collar 48 of insulating material suitable for the purpose such, for example, as hard rubber, fiber, Bakelite or the like adapted to engage the contact spring 49 and move the contact spring 49 into contact with the contact spring 51 as the member 43 is moved inwardly by the spring 44. The contact springs 49 and 51 are supported by a bracket 52 and electrically insulated therefrom as by the insulating washers 53, the springs being maintained in the assembled position by the screws 54 and clamping plate 55. The bracket 53 is secured to the casing 13 as by the screws 56.

The casing 13 is provided with a control chamber 57, FIG. 3, adapted to be enclosed by a block 58 preferably circular in shape secured thereto as by the bolts 59, a gasket 61 being provided between the block and the casing 13 to provide a watertight joint therebetween. A filler plug 62 is provided within the block 58 whereby the chamber may be filled with a fluid such, for example, as water or an anti-freeze solution suitable for the purpose prior to the launching of the device within the water, the plug having a shoulder 63 thereon adapted to engage a gasket 64 assembled between the filler plug and the block whereby the leakage or seepage of water therebetween is prevented.

The block is also provided with a duct 65 adapted to be brought into alinement with an aperture 66 whereby a communication between the flotation chamber 67, the chamber 57 and the surrounding water is established. An adjustable screw or valve 68 is also provided within the block 58 whereby the rate of flow of the water between the chambers 67 and 57 and the well 22 may be initially adjusted. The duct 65 is provided with a branch 69 communicating with the chamber 57, the branch 69 including an adjusting screw or valve 71 whereby the rate of flow of the water between the chambers 67 and 57 in response to a predetermined pressure differential therebetween may be varied at will. The valve 71 is preferably in alinement with a plug 72 fitted within the block 58, although it will be obvious to those skilled in the art that various other forms of adjusting means may be employed for controlling the flow of water between the chambers 57 and 67 and between the chamber 67 and the well 22 through the aforesaid duct 65.

There is also provided within the block 58 a second duct or branch 73 extending from the duct 65 intermediate the adjusting valve 68 and the chamber 57 in communication with a cylindrical portion 74 of the block 58 communicating with the well 22 and having a member or valve 75 slideably arranged therein and adapted to close the duct 73 when the member 75 is opposite a port 76 with which the duct 73 is connected. The valve 75, it will be noted, is preferably rounded or tapered at the periphery thereof whereby the valve opens progressively in accordance with the degree of movement of the valve in either direction from the balanced or closed position thereof in alinement with the port 76. The valve member 75 is provided with a plurality of apertures 77 adapted to permit the flow of water therethrough between a recessed portion 78 within the block 58 and the interior of a Sylphon bellows 79 secured to the block 58 as by the support 81 threaded within the block 58 and having an aperture 82 therein within which is arranged the shaft or plunger 83 to which the valve 75 is secured. The recessed portion 78 of the block 58 is preferably covered by a suitable mesh or screen 84 secured to the block in any suitable manner as by the screws 85 thereby to exclude foreign matter or forms of sea life from the interior of the depth regulating mechanism. Whereas in FIG. 3 two screens are shown for preventing the entrance of foreign substances within the depth control mechanism it will, of course, be understood that this is merely a precautionary expedient and it is obvious that, if desired, one or both of the screens may be omitted without departing from the principles and scope of the invention herein disclosed.

The Sylphon bellows 79 is enclosed at the upper end thereof by a plate or closure 86 secured to the plunger 83 in watertight relation whereby an increase in the pressure of the water within the interior of the bellows against the portion 90 of the closure 86 corresponding to the effective area of the bellows 87 is adapted to move the plunger and valve 75 upward, as will more clearly appear as the description proceeds. Secured to the plate 86 in any suitable manner is a Sylphon bellows 87 of smaller diameter than the bellows 79, the upper end of the bellows being provided with a support or plate 88 adapted to be clamped in sealed relation to the upper portion of the chamber 57 as by the studs 89 secured thereto and nuts 91, a gasket 92 being arranged between the support 88 and the aforesaid upper portion of the chamber to insure a watertight joint therebetween. The plate 88 is adapted to support the shaft 83 slideably and is provided with a plurality of apertures 93 adapted to establish communication between the interior of the bellows 87 and the air chamber 94 arranged within the upper portion of the casing 13. Secured to the upper portion of the plunger 83 in any suitable manner as by the pin 95 is a disk shaped member 96 electrically insulated from the shaft as by the insulating sleeve 97 although it will be understood that, if desired, the member 96 may also be composed of insulating material suitable for the purpose such, for example, as Bakelite, hard rubber or the like.

The upper end of the plunger has secured thereto as by the pin 98 a cup shaped member 99 within which is arranged one end of a spring 101, the opposite end of the spring being in engagement as at 102 with a cup shaped member 103 detachably secured to the depth adjusting screw 104 threaded within the plate 17. An arrangement is thus provided in which the plunger 83 is continuously urged downward yieldably by the spring 101 in accordance with the setting of the adjusting screw 104. The nut 105 is threaded on the screw 104 to lock the screw in the adjusted position and a washer or gasket 106 is preferably provided between the nut and the plate 17. The adjusting screw is provided with a circular dial 107 having a plurality of indicia or scale markings 108 thereon adapted to coact with the markings 109 arranged on the scale 111 arranged adjacent thereto and secured to the plate 17 as by the bolts 112. The adjusting screw and scale are enclosed by a cover 113 secured to the plate 17 as by the bolts 114, a suitable gasket 115 being preferably arranged between the cover and the plate to prevent the entrance of water therebetween and the escape of the air within the chamber 94 when the device is submerged within a body of water.

Secured to the lower portion of the chamber 94 as by the bolts 116 is a bracket or support 117 to which are pivotally secured as by the pins 118 a pair of insulating blocks 119 and 121 to which are secured as by the screws 122 the contact arms 123 and 124 respectively. The contact arms 123 and 124 are provided with the adjustable contact screws 125 and 126 adapted to be engaged by the contact springs 127 and 128 respectively as the member 96 moves upwardly or downwardly from the initial balanced position in response to pressure differentials applied to the bellows 79 and 87. The contact springs 127 and 128 are secured to the blocks 119 and 121 respectively in any suitable manner as by the screws 129. With the member 96 in the initial balanced position, FIG. 5, the contact springs 127 and 128 are disengaged from the contact screws 125 and 126 and the insulating blocks 119 and 121 are urged by the spring 131 into engagement with the control limit adjusting screws 132 and 133, respectively threaded within transverse portions of the support 117 and maintained in the adjusted position by the nuts 134 thereby providing an arrangement in which the initial degree of movement of the plunger 83 from the initial balanced position thereof necessary to close the contacts 125 and 126 may be set at will to different positions corresponding to predetermined upper and lower limits of control of the device beyond the depth of submersion set by the adjusting screw 104 beyond which buoyancy or volume changes in the device may be effected.

There is also provided within the chamber 94 a reversible electric motor 135, hereinafter referred to as M, having a relatively slow rate of acceleration, the motor being secured to the casing 13 in any suitable manner as by the bolts 136. The motor is provided with a gear 137 in meshed engagement with the gear 138 to which is secured the gear 139, the gears 138 and 139 being mounted on a shaft 141, FIG. 4, journaled within the support 142 secured to the casing 13. The gear 139 is in mesh with a gear 143 secured to the threaded shaft 144 as by the pin or bolt 145, the shaft being rotatably mounted within the support 146 secured to a circular plate 147 by the bolts 148 whereby the shaft 144 is concentric with an aperture 149 within the plate. The shaft is provided with a collar 151 in abutting relation with the support 146 whereby endwise movement of the shaft is prevented. Within the aperture 149 is secured in any suitable manner one end of a Sylphon bellows 152, the opposite end of the bellows being closed by a plate 153 secured thereto to which is affixed the tubular member 154 in threaded engagement with the lower end of the shaft 144. The plate 147 is secured to the casing 13 as by the bolts 155, a gasket 156 being provided between the plate and the casing to insure a watertight connection therebetween. The interior of the bellows 152 is in communication with the air chamber 94 and the exterior of the bellows communicates with the water within the flotation chamber 67, the water being initially introduced therein through an aperture 157 within the casing 13 adapted to be sealed by the plug 158 and washer 159.

There is threaded on the upper portion of the shaft 144 a contact actuating nut 161 preferably of insulating material suitable for the purpose such, for example, as hard rubber, Bakelite or the like having a slotted portion 162 therein within which is arranged the guide member 163 secured to the plate 17 in any suitable manner as by the bolts 164 thereby providing an arrangement in which the contact actuating nut 161 is moved axially along the shaft 144 in proportion to the degree of rotative movement of the shaft.

The casing 13 has an upwardly extending portion 165 to which is secured as by the screws 166 a bracket 167 having contact springs 168 and 169 adapted to be disengaged from the contact springs 171 and 172 respectively by engagement with the nut 161 when the nut has moved a predetermined distance along the shaft 144, the arrangement of contact springs and nut comprising a limit switch adapted to interrupt the operating circuit to the motor when the volume changing bellows 152 has expanded or contracted, as the case may be, to a predetermined setting.

The limit switch extends through an aperture 173 within the plate 17, the aperture being sealed by a cover 174 detachably secured to the plate 17 as by the bolts 175, a suitable gasket 176 being provided between the cover and the plate 17 to prevent the entrance of water within the air chamber 94 or the escape of air therefrom when the device is submerged within a body of water.

Secured to the casing 13 in any suitable manner within the chamber 94 is a compartment 177, FIG. 4, having a battery 178, hereinafter referred to as BA, therein and provided with a pair of terminals 179 extending through suitable apertures within the cover 181 secured thereto as by the screws 182. The battery is insulated from the casing 13 by a wrapping of insulating material 183 suitable for the purpose such, for example, as rubber thereby providing an arrangement in which the battery is protected from damage or injury as the result of handling, transportation and planting of the device within the water.

An alternate form of cover for the well 22 is shown on FIGS. 8 and 9 of the drawings in which the cover is designated by the numeral 184 and provided with an eye member 185 to which the length of wire 32 is connected. The cover is provided with a rounded portion as at 186 whereby the ends of the arms 187 of the clamping ring 188 are adapted to maintain the cover securely clamped to a gasket 189 arranged within an annular member 191 secured to the plate 17 as by the screws 192, the screws also maintaining the clamping ring secured to the plate 17. When the arming pin is withdrawn, sufficient tension is applied to the wire 32 to withdraw the cover 184 from engagement with the aforesaid gasket, the arms 187 of the clamping ring being of insufficient strength to withstand the pull of the wire 32 and the arms, therefore, are bent outwardly sufficient to allow the cover to be detached from the plate 17 and thereby establish communication between the surrounding water and the depth control mechanism.

The operation of the device will now be described. Let it be assumed, by way of example, that the depth adjusting screw 104 is set for a depth of submersion of twenty feet beneath the surface of the water, the contact screws 125 and 126 and the limit control screws 132 and 133 are adjusted to cause the motor reversing switch contacts 125 and 126 to be closed selectively when the device has moved within the water from the twenty foot depth of submersion to a depth of submersion of eighteen feet and twenty-two feet respectively, hereinafter referred to as the upper and lower control limits of submersion. Let it also be assumed that the volume control bellows 152 is preset to substantially the position shown on FIG. 3, that the chambers 57 and 67 and the well 22 are filled with a fluid such as water or a non-freezing solution suitable for the purpose, the device is assembled within the mine, the cover 25 is held in a closed position by the clip 27, the arming pin 33 is in the assembled position within the plunger 34 and the arming wire 35 is secured to the arming pin and the arming pin is operatively connected to the clip 27. The motor reversing switch contact 126 is closed by reason of insufficient pressure of the water within the bellows 79, the motor being prevented from operating prior to the launching of the mine by the contacts 49 and 51 of the starting switch, hereinafter referred to as SS which are maintained in the open position by the arming pin 33.

Figure 10:
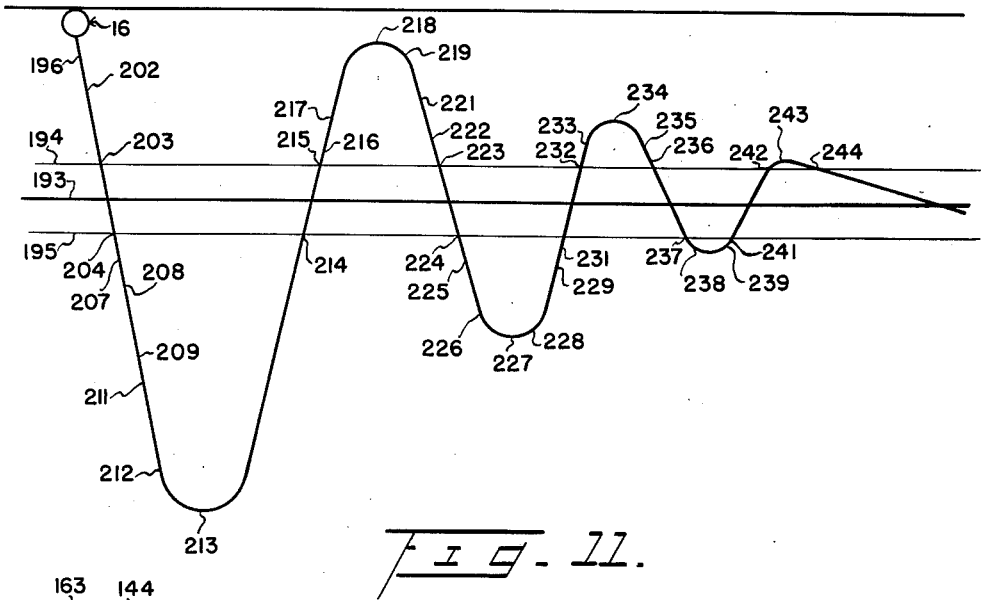
FIG. 10 illustrates in diagrammatic form the operation of the device in regulating the depth of submersion of a mine planted within a body of water; and, FIG. 11 shows in diagrammatic form an arrangement of electrical circuits and depth control mechanism suitable for use with the device of the present invention.

The operation of the device will best be understood by reference to FIG. 10 in which the predetermined depth of submersion at which the mine 16 is set is illustrated by the line 193 and the upper and lower control limits or tolerance at which the motor reversing switch is adapted to be effective are represented by the lines 194 and 195 respectively thereby establishing a zone within which the motor reversing switch is ineffective, the curve 196 being employed to illustrate the movement or travel of the mine from the moment of launching of the mine within a body of water until the mine has been adjusted by the depth control mechanism to the predetermined depth of submersion.

Figure 11:
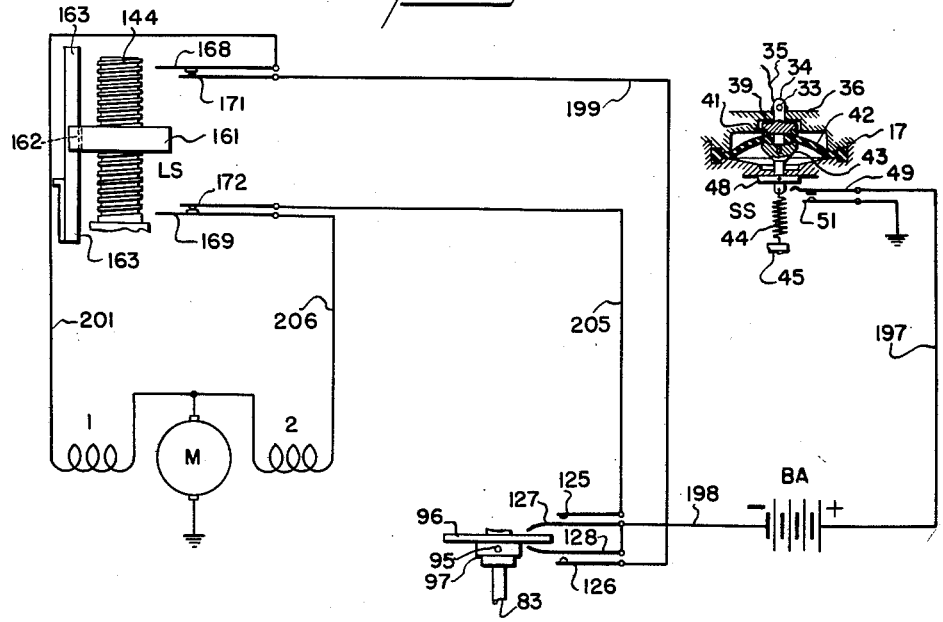

As the arming wire is removed at the time of launching of the device within the water, the arming pin 33 secured thereto is withdrawn from the plunger 34 and the clip 27 is rotated about the support 28 by the arming wire sufficiently to be disengaged from the retaining elements 29 thereby detaching the cap 25 from the plate 17. As the arming pin is withdrawn from the plunger 34 the collar 48 secured thereto is moved inwardly by the spring 44 thereby causing the starting switch SS to close the contacts 49 and 51 thereof and set the motor in operation in a direction to compress the bellows 152 and concurrently therewith, move the limit switch control member 161 toward the contact spring 168. The motor operating circuit may be traced from ground at contact spring 51 of switch SS, FIG. 11, contact spring 49, conductor 197 and thence to the positive terminal of battery BA, the circuit being continued by way of the negative terminal of battery BA, conductor 198, contact springs 128 and 126 of the motor reversing switch which, it will be recalled, are at this time in engagement with each other, conductor 199, contact springs 171 and 168 of the limit switch LS, conductor 201, winding 1 of the motor M and thence by way of the motor armature to ground. The motor continues to operate until the member 161 has moved upwardly along the shaft 144 for a distance sufficient to move the spring 168 out of engagement with the spring 171 thereby interrupting the motor operating circuit and bringing the motor to rest with the displacement bellows fully contracted. It may be assumed, for the purpose of explanation, that this occurs at the point 202 on the curve 196. The mine continues to descend within the water by reason of the quantity of water within the flotation chamber 67 which at this time is of sufficient volume to impart a negative buoyancy to the mine.

As the mine passes below the upper control level 194 at the point 203 on the curve 196, the member 96 is moved upward by the closure 86 by reason of the increase in the pressure of the water against the portion 90 thereof sufficiently to disengage the contact spring 128 from the contact spring 126 and, as the mine passes beneath the lower control level 195 at 204, the member 96 is moved upwardly by the closure 86 against the pressure of the spring 101 and against the pressure of the water within the chamber 57 sufficiently to cause contact spring 127 of the motor control switch to move into engagement with contact 125 thereby closing a circuit from ground at the starting switch SS by way of conductor 197, battery BA, conductor 198, contact springs 127 and 125 of the motor control switch, conductor 205, contact springs 172 and 169 of the limit switch LS, conductor 206, winding 2 and armature of the motor M and thence to ground thereby causing the motor to operate in a direction to expand the bellows 152 and move the member 161 along the shaft 144 toward the spring 169 of the limit switch. As the member 161 moves away from the upper limit position thereof, contact spring 168 moves into engagement with contact spring 171 but without effect at this time for the reason that contact spring 126 of the motor reversing switch is disengaged from contact 128.

When the member 96 has moved sufficiently to cause the motor reversing switch to close at the contact 125 thereof, the valve 75 is opened by a slight amount only and the expansion of the bellows 152, therefore, causes a relatively small flow of water through the duct 73 in addition to the flow of water past the valve 68 and the pressure within the flotation chamber 67, hereinafter referred to as transient pressure, is transmitted by way of the duct 69 and valve 71 to the control chamber 57, thereby causing the bellows 79 to be moved downwardly sufficiently to move the contact spring 127 out of engagement with the contact 125 at the point 207 on the curve 196. When this occurs, the motor stops by reason of the operating circuit therefor being interrupted at the contact springs 125 and 127 of the motor control switch. The mine, however, continues to move downward by reason of the negative buoyancy imparted thereto by the contracted bellows 152.

It will now be apparent that when the motor M and the bellows 152 are at rest the pressures in chamber 57, chamber 67 and within the bellows 79 will quickly reach a state of equilibrium with the pressure of the surrounding water at the momentary depth of submersion of the body, and therefore the bellows 79 including the closure 86 and excluding that portion 90 of the closure 86 corresponding to the effective area of the bellows 87, is not responsive to changes in the pressure of the surrounding water. Furthermore, the interior of the bellows 79 is continuously and freely in communication with the surrounding water, and that portion 90 of the closure 86 equal, as heretofore stated, to the effective area of bellows 87 is in equilibrium between the combined pressure of the spring 101, the air in the chamber 94 and the pressure of the surrounding water, and the closure 86 and the parts fixedly connected thereto are responsive positionally to changes in any of these pressures. Thus it is evident that any position normally taken by the closure 86 in response to the pressure of the surrounding water will be modified by transient pressure differentials communicated to the control chamber 57 by reason of motion of bellows 152.

As the mine continues to move downward within the water the modifying pressure within the chambers 57 and 67 is removed by leakage of the water therefrom through the ducts 69, 65 and 73 concurrently with an increase in the pressure of the water within the bellows 79 until the pressure differential between the water within the bellows 79 and the downward pressure against the portion 90 of the closure 86 has reached a value sufficient to move the plunger 83 in an upward direction against the spring 101 sufficiently to close the upper pair of contacts 125 and 127 of the motor control switch at 208 on the curve 196.

During the interval while the motor is accelerating and bellows 152 is building up a modifying pressure in control chamber 67 and the modifying pressure is being transmitted to chamber 57, the mine will have traversed downward beyond the position at which contacts 125 and 127 were closed and the plunger 83 will have continued positional response corresponding to the increased depth of the mine. The valve 75 attached to the plunger 83 is somewhat wider open than at the time the motor starting contacts were closed at point 208 affording a partial vent for the modifying pressure. Hence during the major portion of the running time of the motor the modifying pressure applied to bellows 79 is lower than is the case while the body is closer to the desired depth. As the plunger 83 moves downward in response to the modifying pressure within the chamber 57 this pressure increases by reason of the closing of valve 75 and thus the opening of the motor control switch is effected during relatively rapid movement of the plunger 83.

During the time the motor switch contacts 125 and 127 are closed the motor is in operation in a direction to expand the bellows 152 and move the control member 161 downwardly.

When the mine reaches the point 211 of the curve 196 the pressure differential applied to the closure 86 again causes the contact springs 125 and 127 to be engaged and the operation of the motor to be resumed. The motor continues to operate until the member 161 moves into engagement with contact spring 169 and moves contact spring 169 out of engagement with contact spring 172. When this occurs, the motor is arrested at 212 on the curve 196 and the bellows 152 is expanded to the limit and the mine has imparted thereto a maximum positive degree of buoyancy. Whereas during the downward movement of the mine between the points 204 and 212 of the curve 196 it has been assumed that the operation of the motor was interrupted twice by reason of the anticipation feature of the device and finally brought to rest by the operation of the lower pair of contacts 169 and 172 of the limit switch, it will be understood that this particular operation is by way of example only as in practice the operation of the motor may be interrupted a greater number of times depending upon the adjustment of the valves 71 and 68 and, furthermore, the mine may be arrested during its first downward movement within the water before the motor has made a sufficient number of revolutions to cause the lower contact springs 169 and 172 of the limit switch to be opened by the member 161. In general it may be stated that the setting of the valve 71 determines how rapidly the anticipation pressure is varied within the control chamber 57 by movements of the volume displacement bellows 152, and the adjustment of the valve 68 determined the maximum pressure differential between the chamber 67 and the surrounding water and the maximum transient pressure differential between the control chamber 57 and the surrounding water available for controlling the operation of the bellows 79.

Referring again to FIG. 10, the mine continues to move downward within the water by reason of the momentum of the mine until the point 213 of the curve 196 is reached, the mine thereafter moving upward within the water past the control level 204 at the point 214. As the mine passes beyond the lower control level the contact springs 125 and 127 which have remained closed since point 211 are disengaged and, as the mine passes above the upper control level at the point 215, the contact spring 128 of the control switch is moved into engagement with the contact 126 thereby closing a circuit from ground at the starting switch SS by way of conductor 197, battery BA, conductor 198, contact springs 128 and 126, conductor 199, contact springs 171 and 168 of the limit switch LS, conductor 201, winding 1 and armature of the motor M and thence to ground thereby causing the motor to operate in a direction to contract the bellows 152 and move the member 161 upwardly. As the member 161 moves away from the lower limit position, contact spring 169 moves into engagement with contact spring 172, the contraction of the bellows 152 causing a reduction in the pressure of the water within the flotation chamber 67 and causing a flow of water into the flotation chamber through the duct 65 by way of the valve 68 and a small additional flow of water by way of the duct 73. The pressure of the water within the control chamber 57 is quickly reduced at this time by reason of the nearly closed condition of the valve 75 whereby the differential pressure between the control chamber and the surrounding water causes the plunger to be moved upwardly by the bellows 79 and interrupt the operating circuit to the motor at the contacts 128 and 126 of the motor control switch at 216 of the curve 196.

When the mine reaches the point 217 on the curve 196 the pressure differential of the spring 101 and the surrounding water causes the plunger 83 to be moved downwardly sufficiently to close the lower pair of control contacts 128 and 126 and the operation of the motor is resumed. The mine continues to rise within the water until the point 218 of the curve 196 is reached when the direction of movement of the mine is reversed by reason of the negative degree of buoyancy imparted thereto by the contraction of the bellows 152. At the point 219 of the curve 196 the bellows 79 is moved sufficiently by the reduction in pressure within the control chamber 57 caused by the contraction of the volume control bellows 152 to move the shaft 83 upwardly for a distance sufficient to disengage the contact spring 128 from the contact 126 and bring the motor to rest. The motor, however, is operated for a somewhat longer period of time before being brought to rest by reason of the increased opening of the valve 75 which, as heretofore stated, is proportional to the degree of movement of the mine from the predetermined depth of submersion illustrated by the line 193.

As the mine descends to the point 221 on the curve 196 the pressure differential on the portion 90 of the closure 86 causes the lower motor control contacts 126 and 128 to close and the motor to be again set in operation in a direction to contract the bellows 152. The operation of the motor, however, is interrupted at 222 by the reduction in pressure within the control chamber 57 which causes the contacts 128 and 126 to be disengaged within a relatively short time after the motor has been set in operation by reason of the partially closed condition of the valve 75. It may now be assumed that the mine passes below the upper control level 194 at 223 before the pressure differential of the water on the bellows 79 has changed sufficiently to close the contacts 126 and 128.

As the mine passes below the lower control level 195 at 224 the pressure differential on the portion 90 of the closure 86 causes the plunger 83 to be moved upward sufficiently to close the upper pair of control contacts 127 and 125 thereby closing a circuit from the battery BA by way of the contact springs 172 and 169 of the limit switch 65 to winding 2 and the armature of the motor M and causing the motor to operate in a direction to expand the bellows 152 and decrease the volume of water within the flotation chamber 67. The pressure differential between the control chamber 57 and the surrounding water causes the bellows 79 to move the shaft 83 downwardly sufficient to disengage contact spring 127 from contact 125 and bring the motor to rest at 225.

When the mine reaches the point 226 on the curve 196 the pressure differential applied to the portion 90 of the closure 86 has reached a value sufficient to move the plunger 83 upwardly and close the upper control contacts 127 and 125 thereby setting the motor in operation in a direction to expand the bellows 152 and expel an additional quantity of water from the flotation chamber 67. As the mine reaches the point 227 on the curve 196 the direction of movement of the mine is reversed and the mine moves upward within thhe water until the point 228 is reached at which time the bellows 79 moves the shaft 83 downwardly sufficient to interrupt the motor operating circuit at contacts 125 and 127 of the control switch. When the mine reaches the point 229 on the curve 196 the control contacts 127 and 125 are again closed by the bellows 79 thereby additionally operating the motor in a direction to expand the bellows until the point 231 is reached at which time the pressure within the control chamber 57 increases sufficiently to contract the bellows 79 and open the motor operating circuit at the upper contacts 127 and 125 of the motor control switch, thereby bringing the motor to rest when the motor has operated for a short period of time, by reason of the substantially closed position of the valve 75.

As the mine rises above the upper control level 194 at 232 the differential pressure against the portion 90 of the closure 86 causes the contacts 128 and 126 to be closed and the motor to be operated in a direction to contract the bellows 152 and cause additional water to be drawn within the flotation chamber 67. As the mine reaches the point 233 on the curve 196 the reduction in pressure within the control chamber 57 causes the contacts 126 and 128 to be disengaged and the motor to be brought to rest. As the mine reaches the point 234 of the curve 196 the direction of movement of the mine is reversed and when the mine has descended to the point 235 the pressure differential between the water within the control chamber 57 and the surrounding water has been changed sufficiently to cause the lower pair of control contacts 128 and 126 to be closed and the motor to be set into operation in a direction further to contract the bellows 152. As the mine reaches the point 236 on the curve 196 the reduction in pressure within the chamber 57 caused by the contraction of the bellows 152 is sufficient to move the plunger 83 upwardly sufficiently to interrupt the motor operating circuit at contact springs 128 and 126 of the control switch and bring the motor to rest.

As the mine passes beneath the lower control level 195 at 237 the plunger 83 is raised by the portion 90 of the closure 86 sufficiently to move the contact spring 127 into engagement with contact spring 125 thereby closing a circuit from battery BA to winding 2 of the motor M and causing the motor to operate in a direction to expand the buoyancy control bellows 152. When the mine reaches the point 238 on the curve 196 the pressure of the water within the control chamber 57 has increased sufficiently, by reason of the almost closed condition of the valve 75 in response to the expansion of the bellows 152, to cause the plunger 83 to be moved downwardly by the bellows 79 sufficient to disengage contacts 127 and 125 and bring the motor to rest. When the mine reaches the point 239 on the curve 196 the pressure within the chamber 57 has changed sufficiently to cause the plunger 83 to be moved upwardly by the portion 90 of the closure 86 and close the operate circuit to winding 2 of the motor at contacts 127 and 125 of the motor control switch.

Just before the mine passes above the lower control level 195 at 241 the differential pressure applied to the portion 90 of the closure 86 in addition to the transient pressure received from the chamber 67 causes the plunger 83 to be moved sufficiently to interrupt the motor circuit at the control contacts 127 and 125 thereby bringing the motor to rest. The mine is at this time only slightly positively buoyant, the buoyancy thereof having been adjusted by increments during each travel of the mine beyond predetermined control limits of submersion progressively to the specific gravity of the surrounding water.

The mine now rises slowly within the water and crosses the upper control limit 194 at 242 thereby causing the bellows 87 to be expanded by the pressure differential of the water thereagainst sufficiently to move the plunger 83 downwardly and close the motor control contacts 128 and 126. A circuit is now closed from the battery BA and by way of contacts 128 and 126 and the upper contacts 171 and 168 of the limit switch to winding 1 of the motor M thereby causing the motor to operate in a direction to contract the bellows 152. As the mine reaches the point 243 of the curve 196 the pressure differential between the water within the control chamber 57 and the surrounding water caused by the contraction of the bellows 152 within the flotation chamber 67 is sufficient to move the plunger 83 upwardly and interrupt the operate circuit to the motor at the contacts 128 and 126 of the control switch and bring the motor to rest within a brief period of time after the motor has been set in operation by reason of the substantially closed condition of the valve 75. It may now be assumed for the purpose of description that the adjustment of the buoyancy of the subfloating body made between the points 242 and 243 of the curve 196 is sufficient to bring the specific gravity of the body into substantial equality with the surrounding water. It may now be assumed for the purpose of explanation that the mine is just sufficiently negatively buoyant as the result of this last adjustment to cause the mine to move downward very slowly within the water crossing the upper control level 194 at 244 and continuing the direction of movement of the mine toward the lower control level 195 and, subject to temperature and salinity changes and external forces, may remain in the selected zone for a considerable period before the controls are actuated.

From the foregoing it will be apparent that I have provided a new and improved depth controlling mechanism for a subfloating body in which volumetric changes in the body are performed variably at intervals during each oscillation of the body beyond predetermined levels or limits of control within a body of water in which the movement of the body within the water toward a predetermined level of submersion during the next succeeding movement of the body past the control levels is anticipated variably in accordance with the degree of movement of the mine beyond the control levels, and in which the anticipation is performed under control of the differential in the pressure within a control chamber and the pressure of the surrounding water, the pressure differential being set up by pressure variations within a flotation chamber caused by the movement of the water displacement device employed for varying the buoyancy of the body.

In accordance with the foregoing description I have found it desirable to effect the aforesaid pressure differential between the control chamber and the surrounding water quickly when the body has moved to a position within the water relatively near the upper and lower control levels and to effect the pressure differential changes between the control chamber and the surrounding water variably in proportion to the degree of movement of the body beyond the aforesaid control limits and thus the volume displacing mechanism is adapted to effect small changes in the specific gravity of the controlled body when the body has moved to a position near the control levels and to effect relatively large changes in the specific gravity of the controlled body when the body has moved to positions corresponding to substantially greater distances beyond the upper and lower control levels.

While there is shown and described herein a certain preferred embodiment of the invention, many other and varied forms and uses will present themselves to those versed in the art without departing from the invention, and the invention, therefore, is not limited either in structure or in use except as indicated by the terms and scope of the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In a subfloating body adapted to perform an oscillating movement about a position of equilibrium below the surface of the water, means for varying the displacement of the body, a source of power adapted to actuate the displacement varying means, a flotation chamber within which the displacement varying means is arranged having an outlet with a reduced portion therein in communication with the surrounding water, a control chamber, a duct having a reduced portion therein for establishing communication between said flotation chamber and the control chamber, an air chamber, a differential bellows comprising two variable elements arranged within said control chamber, the smaller one of the elements being interiorly in communication with said air chamber and the larger one of the elements being interiorly in communication with the water within which the device is arranged, a plunger operatively connected to said differential bellows, means including a pair of contact devices adapted to be operated selectively in accordance with the position of said plunger for reversing the movement of the displacement varying means selectively in accordance with the operated condition of the contact devices, means including a valve adapted to establish a second communication between said flotation chamber and the surrounding water variably in accordance with the movement of said plunger from a predetermined balanced position, and means including a resilient device operatively connected to said plunger for causing the plunger to be moved to said balanced position in response to a predetermined differential of pressure applied to said bellows.

2. In a subflotating body adapted to perform an oscillating movement about a position of equilibrium below the surface of the water, a source of power, means adapted to be actuated by said source of power for varying the displacement of the body, a flotation chamber within which the displacement varying means is arranged having an outlet in communication with the surrounding water, a control chamber in communication with said flotation chamber, a pressure responsive device arranged within said control chamber adapted to be actuated to different settings by variations in the pressure received from said flotation chamber, and means controlled by said pressure responsive device for operatively connecting the displacement varying means to said source of power selectively in accordance with the settings of the pressure responsive device.

3. In a subfloating body adapted to perform an oscillating movement about a position corresponding to a predetermined depth of submersion within a body of water, means for varying the displacement of the body, a flotation chamber within which the displacement varying means is arranged, said flotation chamber having an outlet in communication with the surrounding water, a control chamber in communication with the flotation chamber, means for setting up a pressure differential between the fluid within the control chamber and the surrounding water as the displacement of the body is varied, a pressure responsive device arranged within said control chamber and adapted to be controlled by said pressure differential, a source of power, and means controlled by said pressure responsive device for operatively connecting said displacement varying means to said source of power selectively in accordance with the instant value of said pressure differential.

4. In a subfloating body adapted to perform an oscillating movement about a position corresponding to a predetermined depth of submersion within a body of water, means for varying the displacement of the body, a reversible electric motor operatively connected to said displacement varying means, a flotation chamber within which the displacement varying means is arranged having an outlet in communication with the surrounding water, a control chamber in communication with said flotation chamber, a fluid within said control chamber and said flotation chamber, means for setting up a pressure differential between the fluid within the control chamber and the surrounding water as the displacement of the body is varied, a differential pressure responsive device arranged within said control chamber and adapted to be actuated selectively to a plurality of different settings including an initial balanced setting in accordance with said differential pressure, a pair of contact devices adapted to be operated by said differential pressure responsive device selectively in accordance with the direction and degree of movement of the pressure responsive device from said initial balanced setting, a source of electrical power, and means including a plurality of circuit connections for causing the motor to be operated in either direction by said source of power under control of said pair of contact devices and brought to rest when the pressure responsive device is moved to said initial balanced setting.

5. In a submersible body adapted to perform an oscillating movement about a position corresponding to a predetermined depth of submersion within a body of water, a flotation chamber having a relatively small outlet in communication with the surrounding water, a fluid within said flotation chamber, means for varying the pressure and volume of the fluid within the flotation chamber, a prime mover for said fluid varying means, a control chamber having a fluid therein in communication with said flotation chamber, means for setting up the pressure differential between the fluid within the control chamber and the surrounding water as the volume of the fluid within the flotation chamber is varied, a pressure responsive device arranged within said control chamber and movable to an initial balanced position and to different moved settings in accordance with said differential pressure, a source of power, means controlled by said pressure responsive device for operatively connecting the prime mover to said source of power selectively as the pressure responsive device is moved from said initial balanced position to said different settings by said differential pressure thereby to vary the pressure and the volume of fluid within the flotation chamber, and means settable at will for controlling the maximum degree of pressure variation of the fluid within said flotation chamber available to control the movement of said pressure responsive device from a moved setting to said initial balanced position.

6. In a device for controlling the depth of submersion of a subfloating body within a body of water, the combination of means including a reversible motor for varying the displacement of the water by the body, pressure responsive mechanism having a plurality of pairs of electrical contacts adapted to be closed selectively when the body has traveled in either direction from a predetermined depth of submersion to an upper control level and to a lower control level within the water respectively, a source of electrical power, an operating circuit adapted to be closed selectively by said pairs of electrical contacts from the source of power to said reversible motor thereby to cause the displacement varying means to be actuated by the motor in a direction to reverse the direction of movement of the body within the water, and means for causing the operating circuit to be interrupted by said electrical contacts before the body has reached either one of said upper or lower control levels during the travel of the body within the water toward said predetermined depth of submersion.

7. A subfloating body adapted to oscillate about a position of equilibrium at a predetermined depth of submersion comprising, in combination, a flotation chamber having an aperture therein adapted to admit the passage of water, means for varying the volume and pressure of the water within said flotation chamber, a control chamber in communication with the flotation chamber, a pressure responsive device arranged within said control chamber adapted to be moved from an initial balanced position to a moved position selectively in accordance with the differential pressure within the control chamber and the surrounding water, a source of power, means controlled by said pressure responsive device for causing the volume and pressure varying means to be actuated by said source of power as the pressure responsive device is moved from said balanced position to said moved position, and means settable at will for controlling the rate of flow of the water between the flotation chamber and the control chamber as the pressure of the water within the flotation chamber is varied by said volume and pressure varying means.

8. In a device for causing a submersible body to oscillate about a central position corresponding to a predetermined depth of submersion within a body of water, the combination of a flotation chamber having a fluid therein and an outlet in communication with the surrounding water, means settable at will for adjusting the effective size of said outlet, calibrating means arranged within said flotation chamber for changing the specific gravity of said device and varying the pressure within the flotation chamber concurrently therewith at a rate controlled by the setting of said outlet adjusting means, a control chamber having a fluid therein and a constricted orifice in communication with the flotation chamber through which fluid is adapted to pass, means for setting up a pressure differential between the fluid within the control chamber and the water surrounding the device, a pressure responsive device arranged within the control chamber adapted to be moved to an initial balanced position and to a plurality of moved positions by variations in said differential pressure, a source of power, contact means adapted to connect the calibrating means to said source of power as the pressure responsive device is moved from said initial balanced position to a moved position thereby to cause the pressure and volume of fluid within said flotation chamber to be varied in a direction to reduce the pressure differential between the fluid within the control chamber and the surrounding water, and means including a valve actuated by said pressure responsive device for establishing a second communication between the flotation chamber and the surrounding water variably in accordance with the degree of movement of the pressure responsive device from said initial balanced position.

9. In a device for causing a subfloating body to oscillate about a central position corresponding to a predetermined depth of submersion within a body of water, a flotation chamber having an aperture therein through which the water is adapted to flow, a volume changing device settable to different settings and adapted to vary the volume of water within said flotation chamber, a control chamber having an outlet in communication with said flotation chamber, means for causing variations between the pressure within the control chamber and the pressure of the surrounding water, a pressure responsive device adapted to be actuated to different settings in accordance with said variations, a source of power, means controlled by said pressure responsive device for causing the volume changing device to be set selectively to said different settings by said source of power when the subfloating body has moved a predetermined distance from said central position within the water, and means settable at will for varying the rate of flow of the water through said outlet whereby the changes in volume of the body during each oscillatory movement of the body about said central position beyond a predetermined distance from the central position is effected successively by increments.

10. A subfloating body adapted to oscillate about a position of equilibrium at a predetermined depth of submersion comprising, in combination, a flotation chamber having an aperture therein adapted to admit the passage of water, means for varying the volume and pressure of the water within said flotation chamber, a control chamber in communication with the flotation chamber, a differential pressure responsive device comprising a pair of operatively connected bellows arranged within said control chamber adapted to be moved from a position of balance to different settings, a resilient device operatively connected to said differential responsive device and settable at will to different settings corresponding respectively to different depths of submersion, said resilient device being adapted to apply pressure to the pressure responsive device, an air chamber in communication with the interior of the smaller one of said bellows, means for establishing communication between the interior of the larger one of said bellows and the surrounding water, a source of power, and means controlled by said differential pressure responsive device for causing the volume and pressure varying means to be activated selectively by said source of power as the pressure responsive device is moved from said position of balance to different settings corresponding respectively to the differential in pressure of said resilient device and the pressure of the water on the differential pressure responsive device.

11. A subfloating body adapted to oscillate about a position of equilibrium at a predetermined depth of submersion comprising, in combination, a flotation chamber having an aperture therein adapted to admit the passage of water, means for varying the volume and pressure of the water within said flotation chamber, a water filled control chamber in communication with the flotation chamber and adapted to receive variations in pressure from said flotation chamber, a differential pressure responsive device comprising a pair of operatively connected bellows arranged within said control chamber adapted to be moved to a position of balance and to different settings, means for biasing said differential pressure responsive device, an air chamber in communication with the interior of the smaller one of said bellows, means for establishing communication between the interior of the larger one of said bellows and the surrounding water, a source of power, and means controlled by said pressure differential responsive device for causing the volume and pressure varying means to be actuated selectively by said source of power in a direction to restore the pressure responsive device to said position of balance when the pressure responsive device has been moved from said position of balance to different settings corresponding respectively to the pressure differential of said biasing means and the water in communication with the differential pressure responsive device.

12. In a device for causing a submersible body to oscillate about a central position corresponding to a predetermined depth of submersion within a body of water, the combination of a volume changing device, a control chamber having a fluid therein, means for causing the differential pressure of the fluid within the control chamber to vary with respect to the surrounding water in accordance with the direction of movement of said volume changing device, means including a motor adapted to actuate the volume changing device in either direction to different settings, a source of power, a pressure responsive device within said control chamber having two pairs of contact closing devices adapted to connect the motor to said source of power selectively in accordance with a predetermined value of said differential pressure, and means controlled by said motor for rendering said pairs of contacts respectively ineffective to connect the motor to said source of power when the volume changing device has been actuated to predetermined limits of volume control.

13. A subfloating body adapted to oscillate about a predetermined depth of submersion within a body of water comprising, in combination, a flotation chamber having an aperture therein adapted to admit the passage of water, means adapted to be actuated to different settings for varying the volume and pressure of the water within said flotation chamber, a control chamber having a quantity of water therein in communication with the flotation chamber, a pressure responsive device arranged within said control chamber adapted to be moved from an initial balanced position to a moved position selectively in accordance with the differential pressure of the water within the control chamber and the surrounding water, a source of power, means controlled by said pressure responsive device for causing the volume and pressure varying means to be actuated by said source of power as the pressure responsive device is moved from said balanced position to said moved position, and means including a valve adapted to be operated by said pressure responsive device for controlling the rate of flow and differential pressure of the water between the flotation chamber and the control chamber variably in accordance with the distance between the depth of submersion of the subfloating body within the water and said predetermined depth of submersion.

14. A subfloating body adapted to oscillate about a position of equilibrium at a predetermined depth of submersion comprising, in combination, a flotation chamber hving an aperture therein adapted to admit the passage of water, means for varying the volume and pressure of the water within said flotation chamber, a control chamber in communication with the flotation chamber, a pressure responsive device arranged within said control chamber adapted to be moved from an initial balanced position to a moved position selectively in accordance with the differential pressure within the control chamber and the surrounding water, a source of power, means controlled by said pressure responsive device for causing the volume and pressure varying means to be actuated by said source of power as the pressure responsive device is moved from said balanced position to said moved position, and means including a valve controlled by said pressure responsive device for causing volumetric changes in the subfloating body to be effected by said volume varying means in proportion to the extent of deviation of the device from said position of equilibrium.

15. In a device for controlling the depth of submersion of a subfloating body within a body of water, means forming a flotation chamber and a control chamber within said device, a reversible motor, main bellows means operatively connected to said motor and mounted within said flotation chamber, means forming a control chamber adapted to be filled with water when the device is submerged, duct means forming an inlet and outlet passage between said chambers, motor stop means operatively connected to the motor for stopping the motor when the bellows is in one of two predetermined positions, a battery, a reversing switch mechanism electrically connected between the motor and the battery, means forming an air chamber within the device, second bellows means operatively connected to said switch mechanism and in communication with the interior of said air chamber, third bellows means operatively connected to said second bellows means for movement therewith, said third bellows means having the interior thereof in fluid communication with the exterior of the device whereby the exterior portions of the two last named bellows are in fluid communication with the flotation chamber and variations in pressure within the flotation chamber in response to movement of the main bellows are transferred to the control chamber.

References Cited in the file of this patent

UNITED STATES PATENTS

| | | |
|---|---|---|
| 1,138,269 | Wigelius | May 4, 1915 |
| 1,179,148 | Uhr et al. | Apr. 11, 1916 |
| 1,298,142 | Wirghtson | Mar. 25, 1919 |
| 1,363,958 | Dalen | Dec. 28, 1920 |

FOREIGN PATENTS

| | | |
|---|---|---|
| 16,861 | Great Britain | 1915 |